US010708998B2

United States Patent
Kawano et al.

(10) Patent No.: US 10,708,998 B2
(45) Date of Patent: Jul. 7, 2020

(54) LIGHT CONTROL DEVICE, LIGHTING CONTROL METHOD, AND LIGHTING CONTROL PROGRAM FOR CONTROLLING LIGHTING BASED ON A BEAT POSITION IN A MUSIC PIECE INFORMATION

(71) Applicant: Pioneer DJ CORPORATION, Yokohama-shi, Kanagawa (JP)

(72) Inventors: Hirokatsu Kawano, Yokohama (JP); Toshiki Nakai, Yokohama (JP); Junichiro Inoue, Yokohama (JP)

(73) Assignee: AlphaTheta Corporation, Yokohama-shi (JP)

( * ) Notice: Subject to any disclaimer, the term of this patent is extended or adjusted under 35 U.S.C. 154(b) by 0 days.

(21) Appl. No.: 16/307,667

(22) PCT Filed: Jun. 13, 2016

(86) PCT No.: PCT/JP2016/067556
§ 371 (c)(1),
(2) Date: Dec. 6, 2018

(87) PCT Pub. No.: WO2017/216850
PCT Pub. Date: Dec. 21, 2017

(65) Prior Publication Data
US 2019/0313506 A1 Oct. 10, 2019

(51) Int. Cl.
*H05B 47/10* (2020.01)
*H05B 47/155* (2020.01)
*G10H 1/00* (2006.01)

(52) U.S. Cl.
CPC ......... *H05B 47/155* (2020.01); *G10H 1/0041* (2013.01); *H05B 47/10* (2020.01)

(58) Field of Classification Search
CPC .............. H05B 37/029; H05B 37/0236; H05B 33/0854; H05B 33/0803; H05B 37/02;
(Continued)

(56) References Cited

U.S. PATENT DOCUMENTS 6,175,632 B1 * 1/2001 Marx ................... H04R 29/008
381/56
2002/0154787 A1 * 10/2002 Rice ..................... H04R 29/008
381/124
(Continued)

FOREIGN PATENT DOCUMENTS

JP H10-124078 5/1998
JP 3743079 2/2006
(Continued)

OTHER PUBLICATIONS

English translation of International Preliminary Report on Patentability dated Dec. 18, 2018 (Dec. 18, 2018), Application No. PCT/JP2016/067556, 8 pages.
International Search Report, dated Sep. 6, 2016 (Sep. 6, 2016), 2 pages.

*Primary Examiner* — Tung X Le
*Assistant Examiner* — Borna Alaeddini
(74) *Attorney, Agent, or Firm* — Rankin, Hill & Clark LLP

(57) ABSTRACT

A lighting controller includes: an information acquiring unit configured to acquire music piece information including at least information on a beat position in music piece data; a lighting controller configured to control a lighting fixture with reference to a lighting-effect change point, a minimum unit of the lighting-effect change point being defined by the beat position; and an operation interlock control unit configured to apply, in response to a predetermined operation applied on a music piece reproduction apparatus configured to reproduce the music piece data as a music piece or a music piece reproduction controller configured to control the music piece reproduction apparatus, a predetermined lighting effect corresponding to the operation or a process executed by the operation to the control of the lighting fixture.

9 Claims, 10 Drawing Sheets

Figure 1:
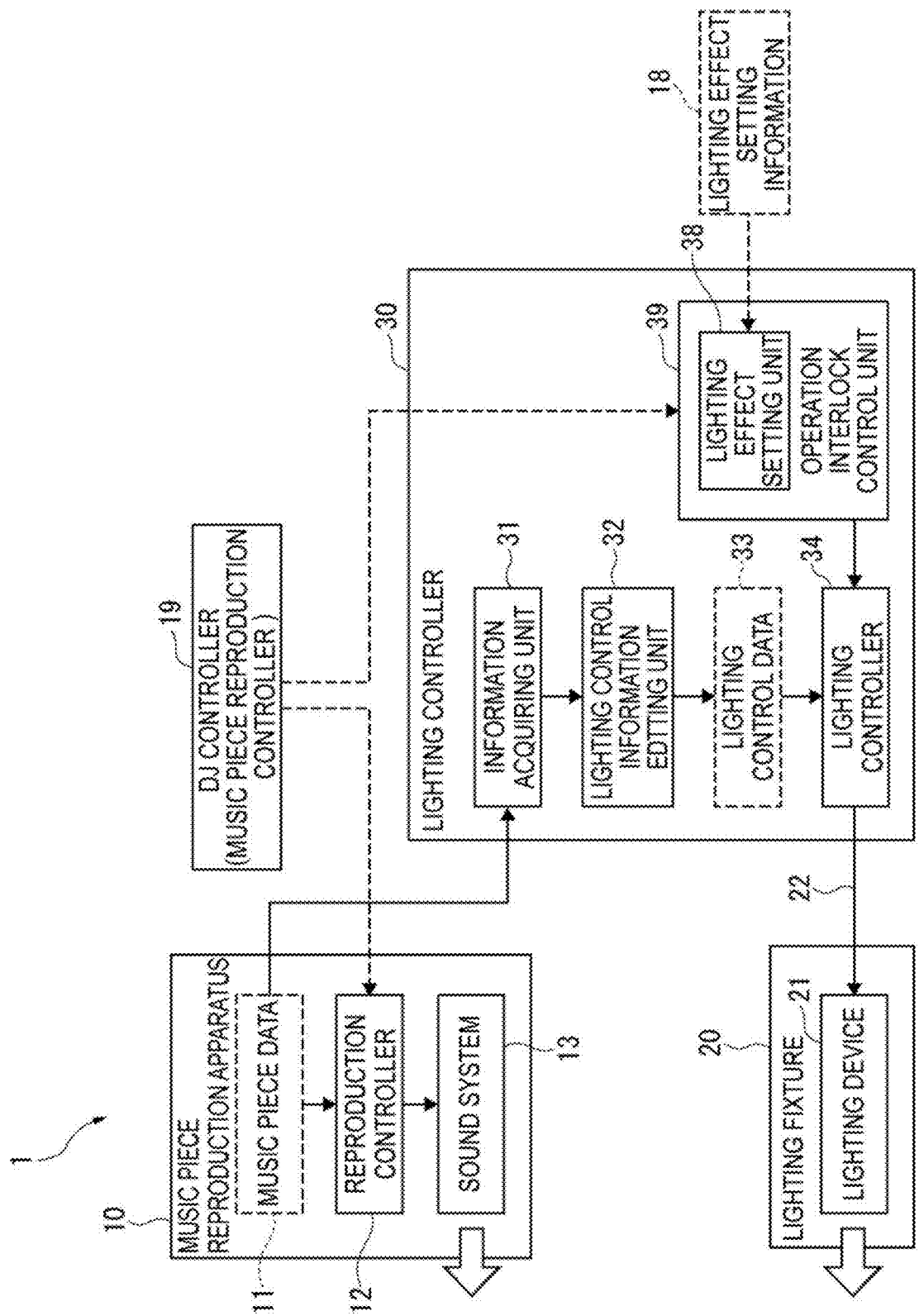

(58) Field of Classification Search
CPC .............. H05B 33/0842; H05B 33/086; H05B
37/0227; H05B 37/0245; H05B 37/0254;
H05B 33/0815; H05B 33/0863; H05B
33/10; H05B 37/0209; H05B 37/0281;
H05B 33/0872; H05B 47/155; H05B
47/10; G10H 1/0025; G10H 1/0041;
G10H 1/0066; G10H 2240/131; G10H
1/0008; G10H 2230/015; G10H
2240/056; G10H 2240/251; G10H
2240/061; G10H 2240/145; G10H
2240/325; G10H 1/40; G10H 2210/151;
G10H 2210/241; G10H 2240/091; G10H
2240/241; G10H 2250/595; G10H
1/0058; G10H 2210/076; G10H
2210/105; G10H 2220/015; G10H
2220/101; G10H 2220/395; G10H
2230/021; G10H 2240/165; G10H
2240/285; G10H 2240/321; G10H
1/0033; G10H 1/361; G10H 1/42; G10H
2210/031; G10H 2210/115; G10H
2220/011; G10H 2220/086; G10H
2240/026; G10H 2240/115; G10H
2240/181; G10H 2210/125; G10H
2220/005; G10H 2250/211; G10H 1/365;
G10H 2220/315; G10H 2240/071; G10H
2240/085; G10H 1/368; G10H 1/26;
G10H 2220/096; G10H 2220/111; G10H
2220/126; G10H 2220/351; G10H
2240/305; G10H 2240/311; G10H
2250/455; G10H 7/00; G10H 7/002;
G10H 7/02; G10H 2210/145
See application file for complete search history.

(56) References Cited

U.S. PATENT DOCUMENTS

| | | | | |
|---|---|---|---|---|
| 2003/0188628 | A1* | 10/2003 | Caillavet | G10H 1/0066 84/645 |
| 2005/0275626 | A1* | 12/2005 | Mueller | H05B 37/0245 345/156 |
| 2006/0130635 | A1* | 6/2006 | Rubang, Jr. | G09B 15/023 84/464 A |
| 2007/0209499 | A1* | 9/2007 | Kotani | G10H 1/0025 84/644 |
| 2008/0110970 | A1* | 5/2008 | Kataoka | G10H 1/34 235/375 |
| 2008/0212437 | A1* | 9/2008 | Kataoka | G05G 1/08 369/53.41 |
| 2012/0126722 | A1* | 5/2012 | Archdale | H05B 47/155 315/312 |
| 2012/0134512 | A1* | 5/2012 | Mashita | G11B 27/005 381/119 |
| 2016/0189699 | A1* | 6/2016 | Garet | G10H 1/32 |
| 2016/0295668 | A1* | 10/2016 | Saijo | H04R 3/14 |
| 2016/0302285 | A1* | 10/2016 | Saijo | H04R 1/028 |

FOREIGN PATENT DOCUMENTS

| | | |
|---|---|---|
| JP | 2007-311155 | 11/2007 |
| JP | 2010-508626 | 3/2010 |
| JP | 2010-097084 | 4/2010 |
| JP | 2010-192155 | 9/2010 |
| JP | 2014-203493 | 10/2014 |
| JP | 2015-055721 | 3/2015 |
| JP | 2015-076625 | 4/2015 |
| WO | 2012/007990 | 1/2012 |
| WO | 2015/092984 | 6/2015 |

* cited by examiner

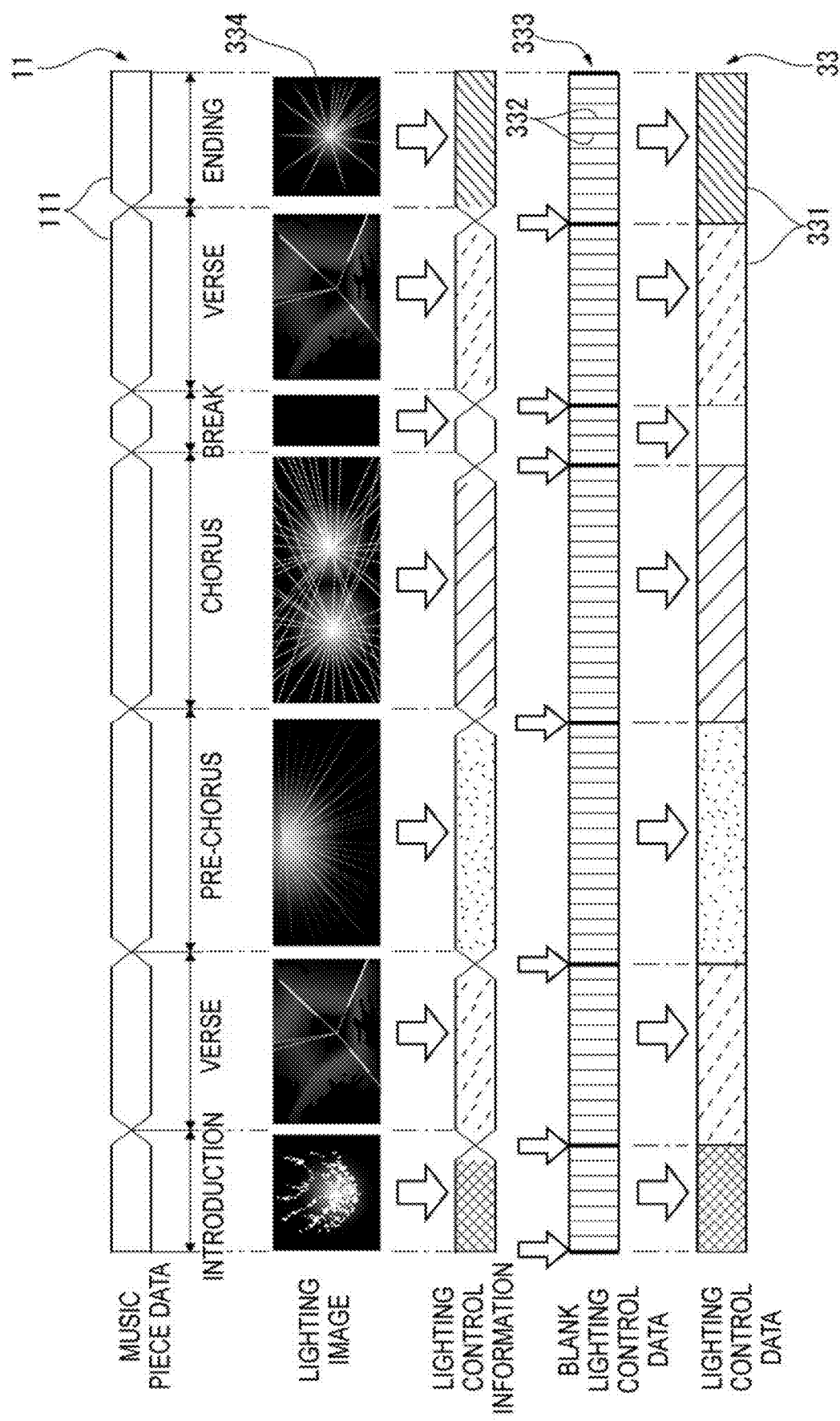

FIG. 5

| OPERATIONAL TERMINAL | PROCESS EXECUTED BY OPERATION | FUNCTION GROUP | LIGHTING EFFECT INFORMATION |
|---|---|---|---|
| ROTARY VOLUME KNOB | LOW-PITCHED SOUND VOLUME INCREASE/DECREASE | ADJUSTMENT | SHIFTING LIGHTING TOWARD BLUE LIGHT AT INCREASE AND TOWARD RED LIGHT AT DECREASE |
| VOLUME SLIDER | SOUND VOLUME INCREASE/DECREASE | ADJUSTMENT | BRIGHTENING AT INCREASE AND DARKENING AT DECREASE |
| CUE BUTTON | JUMP TO CUE POINT | REPRODUCTION POSITION SHIFT | MAXIMUM LIGHT INTENSITY AT JUMP |
| JOG DIAL | ADVANCE/RETREAT | REPRODUCTION POSITION SHIFT | DIRECT LIGHT BEAM TO RIGHT/LEFT CORRESPONDING TO ADVANCE/RETREAT |
| A PAD | ROLL EFFECT ADDITION | SOUND EFFECT | FLASH LIGHTING AT ROLL INTERVAL |
| B PAD | SHORT REVERB ADDITION | SOUND EFFECT | FLASH LIGHTING IN RESPONSE TO REVERB SOUND VOLUME |
| JOG DIAL | SCRATCH OPERATION | SPECIAL REPRODUCTION | DIRECT LIGHT BEAM TO RIGHT/LEFT CORRESPONDING TO ADVANCE/RETREAT |
| CROSS FADER | CHANGE IN SOUND VOLUME RATIO OF MUSIC PIECES (CROSS-FADING) | MIXING | TRANSITION OF LIGHTING EFFECT SET IN EACH MUSIC PIECE |

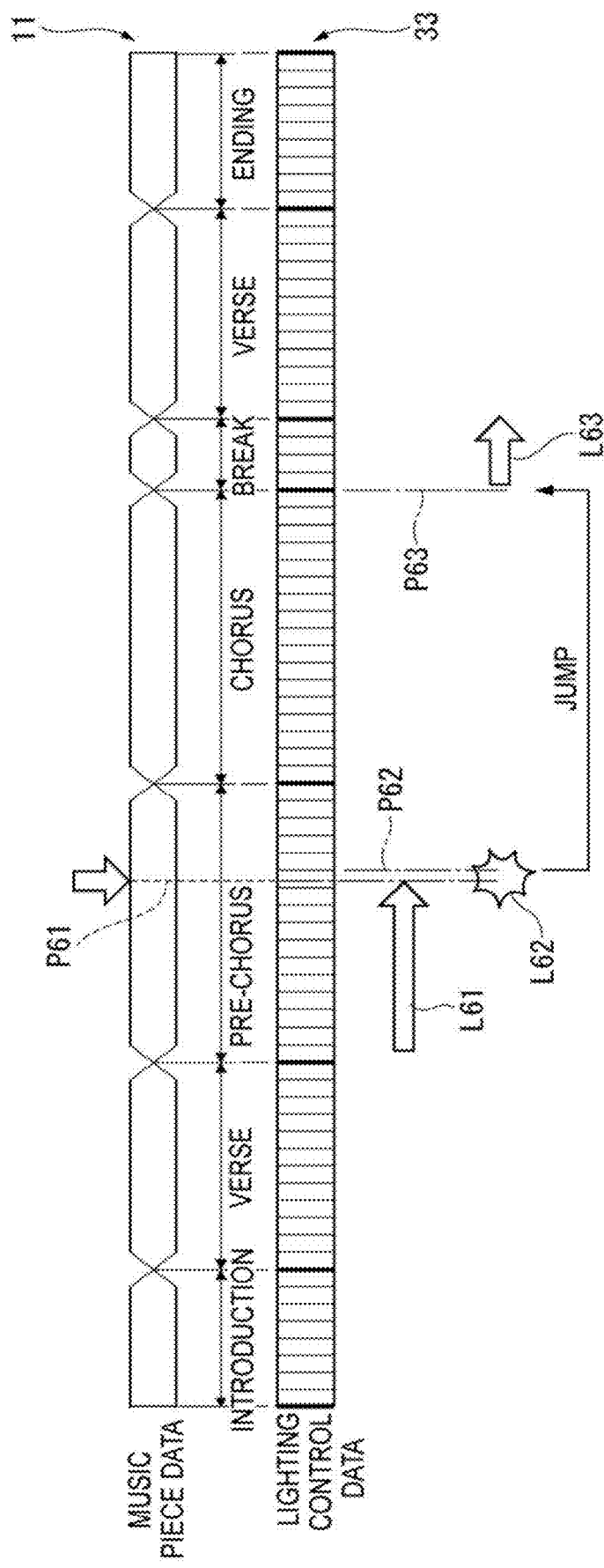

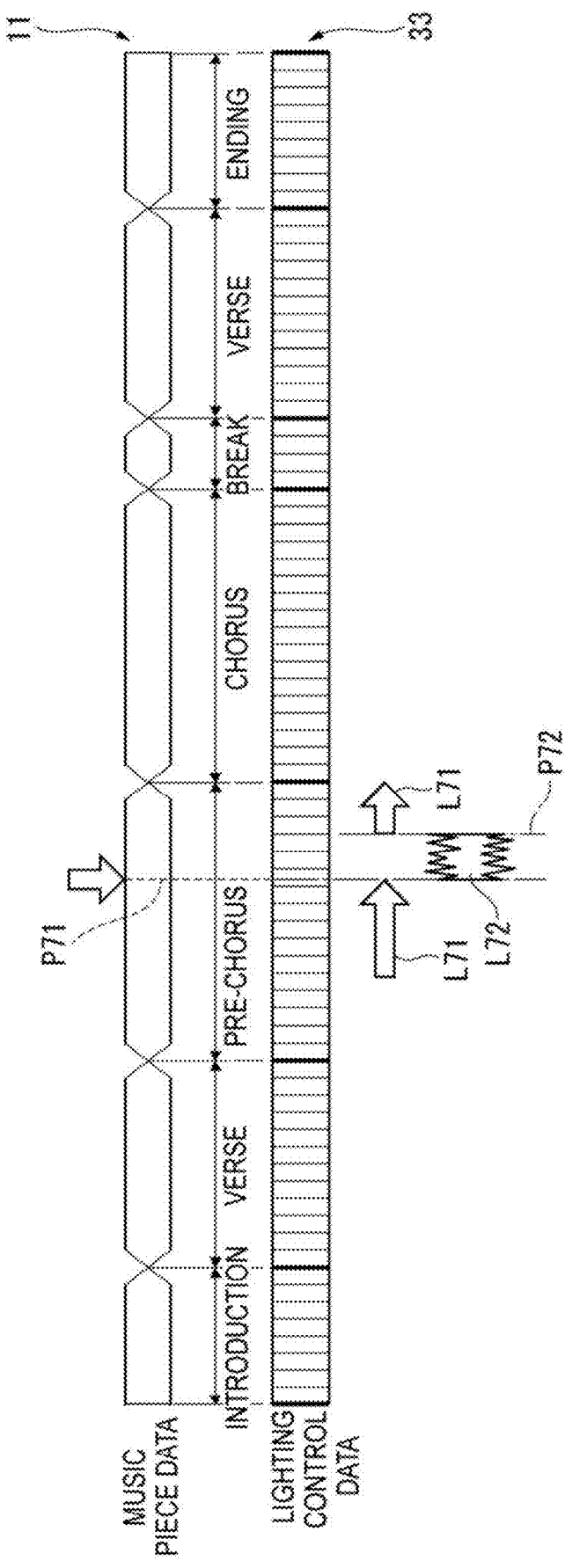

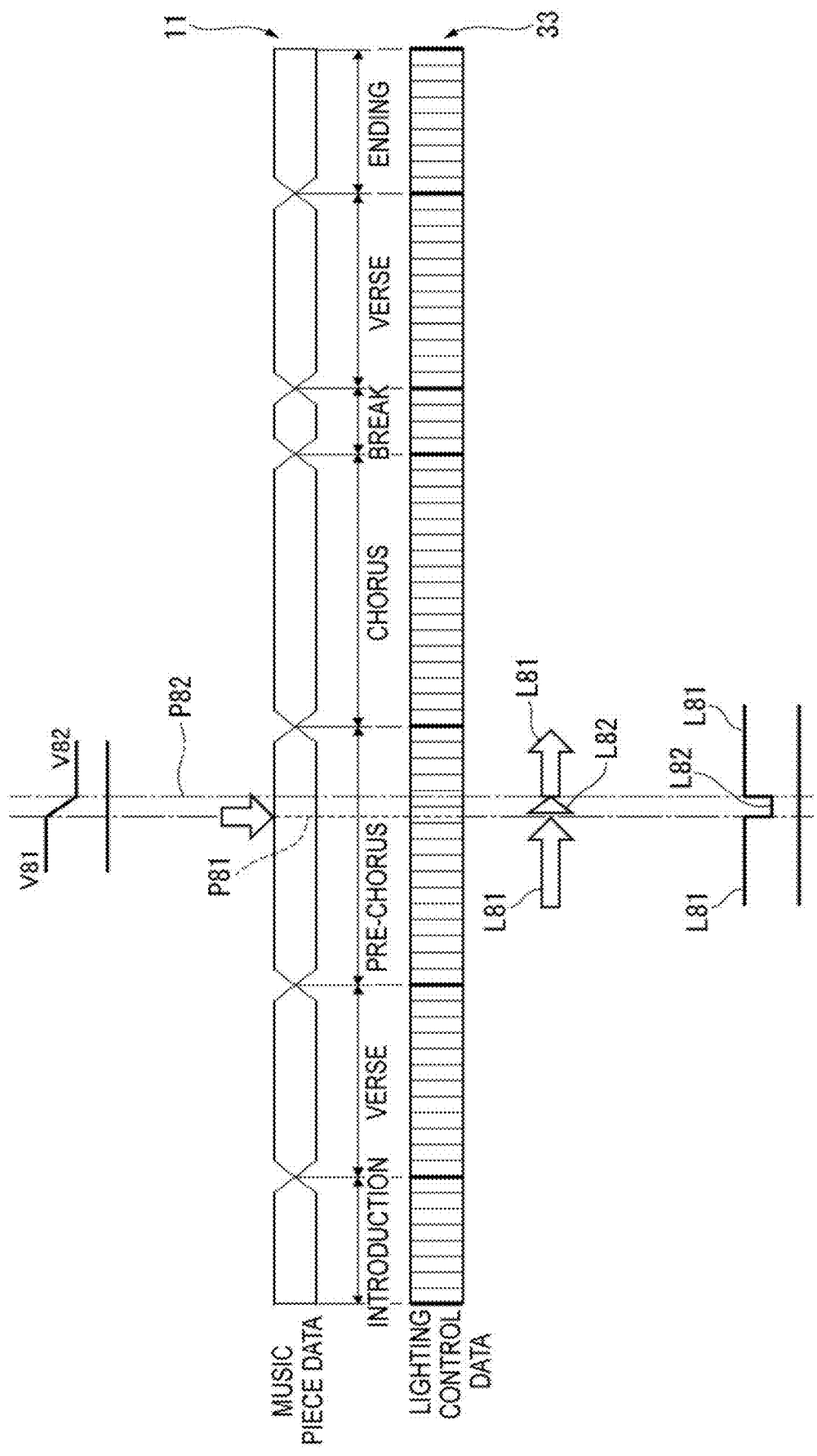

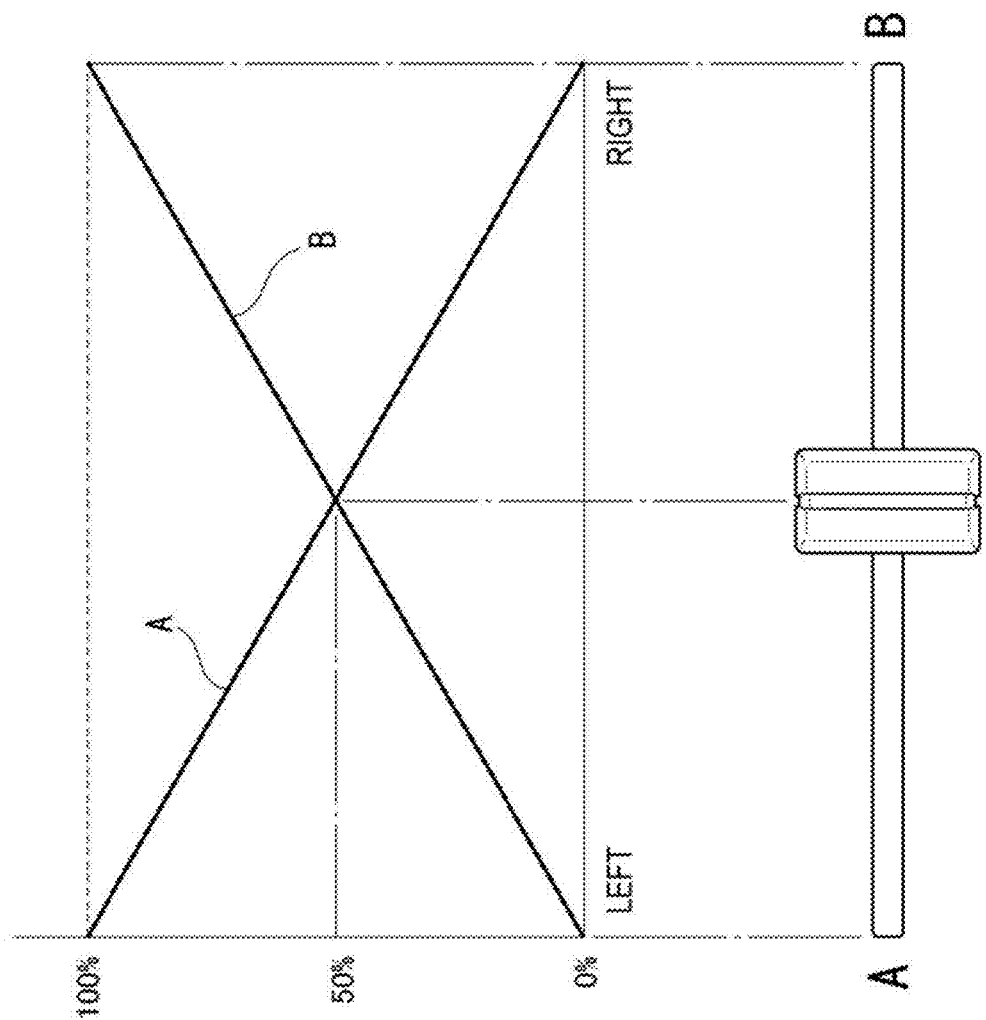

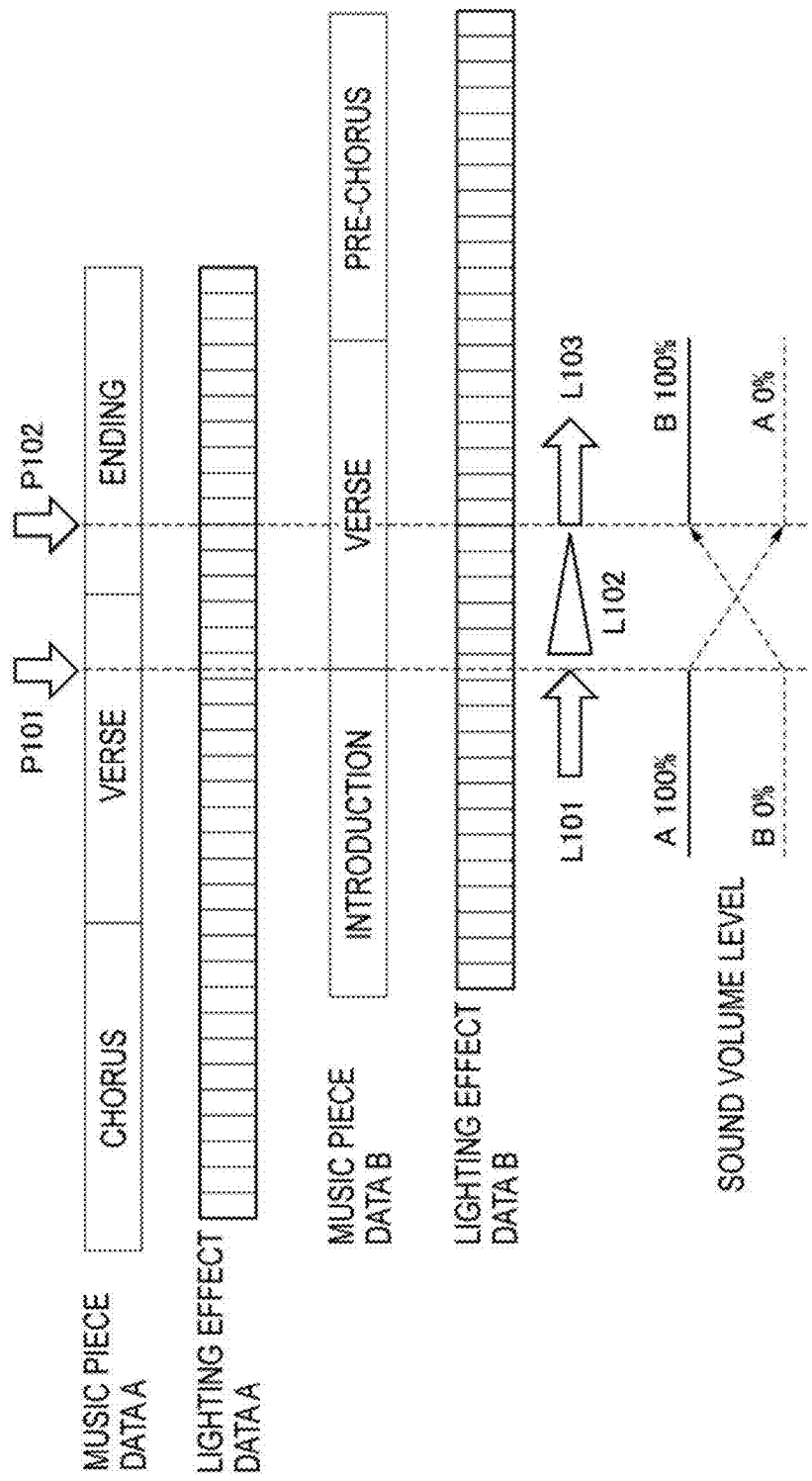

LIGHT CONTROL DEVICE, LIGHTING CONTROL METHOD, AND LIGHTING CONTROL PROGRAM FOR CONTROLLING LIGHTING BASED ON A BEAT POSITION IN A MUSIC PIECE INFORMATION

TECHNICAL FIELD

The present invention relates to a lighting controller, a lighting control method, and a lighting control program.

BACKGROUND ART

In a concert and a night club, it is an important stage factor to match lighting with a music piece or change lighting in synchronization with a music piece.

In order to obtain an accurate stage effect by matching lighting with a music piece, a dedicated lighting staff having a good understanding of the music piece desirably manipulates a lighting device. However, it is difficult in terms of costs and the like that the dedicated lighting staff constantly stays in a small-sized concert, night club, event and the like.

In order to overcome this difficulty, it has been attempted to automatically match lighting with a music piece. For instance, according to the technique of Patent Literature 1 or 2, lighting control data relating to lighting contents matched with the music piece is made in advance and is synchronized with the music piece at the time of a performance, whereby the lighting is controlled based on the lighting control data, so that a desired lighting matched with the music piece is realized.

In order to make the lighting control data, a target music piece data is analyzed in advance and divided into blocks (e.g., a verse, pre-chorus, and chorus), and a lighting pattern suitable to an image of each block is specified to each block.

In such a concert and a night club as described above, a disc jockey (DJ) applies sound effects (e.g., an addition of a hit sound and reverberations, and an emphasis on a sound volume of an entire music piece, low-pitched sounds and high-pitched sounds) or a special reproduction (e.g., scratching, tempo change, and a jump to a cue point) to a music piece that is being reproduced.

However, such operations to be applied at a venue is beyond the lighting control using the prepared lighting control data as described in the above Patent Literatures 1 and 2.

Particularly, since the DJ's operations of the sound effects and the special reproduction are applied to the music piece according to senses of the DJ, it has been difficult to specify suitable lighting effects for the sound effects and the special reproduction to the lighting control while the music piece is being reproduced.

In contrast, Patent Literature 3 discloses a use of a lighting controller, which is configured to transmit a control signal for changing a behavior of a lighting fixture to the lighting fixture in response to an input operation given to an operation input unit, to control lighting in response to an operation in a performance (e.g., scratch play).

CITATION LIST

Patent Literature(s)
Patent Literature 1: JP Patent No. 3743079
Patent Literature 2: JP 2010-192155 A
Patent Literature 3: JP 2007-311155 A

SUMMARY OF THE INVENTION

Problem(s) to be Solved by the Invention

In the above-described Patent Literature 3, an operation of a jog dial is detected and a lighting operation is conducted corresponding to the detected operational amount. Accordingly, operational result or advantages applied to the music piece by the input operation cannot be linked to the lighting effect.

For instance, in Patent Literature 3, lighting is changeable corresponding to motion of the jog dial in response to a forward or backward shift of a reproduction position caused by scratching and the like. However, even if a tempo of the music piece is increased using the jog dial, only the motion of the jog dial is applied to control of the lighting but a reproduction state of the music piece is not always applied to the control of the lighting.

Moreover, in Patent Literature 3, even if the music piece reproduction apparatus or a button of a controller thereof is operated to apply a roll effect (i.e., an effect of reproducing a predetermined section of the music piece at a double speed etc), since the lighting is unlinked to a timing of a roll, a lighting effect (e.g., flashing) matching with the roll cannot be conducted.

Thus, the lighting control of Patent Literature 3 cannot apply a suitable lighting effect in response to the operation given to the music piece that is being reproduced.

An object of the invention is to provide a lighting controller, a lighting control method and a lighting control program, which are capable of applying a suitable lighting effect in response to an operation given to a music piece that is being reproduced.

Means for Solving the Problem(s)

According to an aspect of the invention, a lighting controller includes: an information acquiring unit configured to acquire music piece information comprising at least information on a beat position in music piece data; a lighting control unit configured to control a lighting fixture with reference to a lighting-effect change point, a minimum unit of the lighting-effect change point being defined by the beat position; and an operation interlock control unit configured to apply, in response to a predetermined operation applied on a music piece reproduction apparatus configured to reproduce the music piece data as a music piece or a music piece reproduction controller configured to control the music piece reproduction apparatus, a predetermined lighting effect corresponding to the operation or a process executed by the operation to the control of the lighting fixture.

According to another aspect of the invention, a lighting control method using a computer system includes: acquiring music piece information comprising at least information on a beat position in music piece data; controlling a lighting fixture with reference to a lighting-effect change point, a minimum unit of the lighting-effect change point being defined by the beat position; and in response to a predetermined operation applied on a music piece reproduction apparatus configured to reproduce the music piece data as a music piece or a music piece reproduction controller configured to control the music piece reproduction apparatus, applying a lighting effect corresponding to the operation or a process executed by the operation to the control of the lighting fixture.

According to still another aspect of the invention, a lighting control program is configured to perform, in a computer system, the lighting control method according to the above aspect of the invention instructing the computer system to function as the lighting controller according to the above aspect of the invention.

BRIEF DESCRIPTION OF DRAWING(S)

FIG. 1 is a block diagram showing a structure of an exemplary embodiment of the invention.

Figure 2:
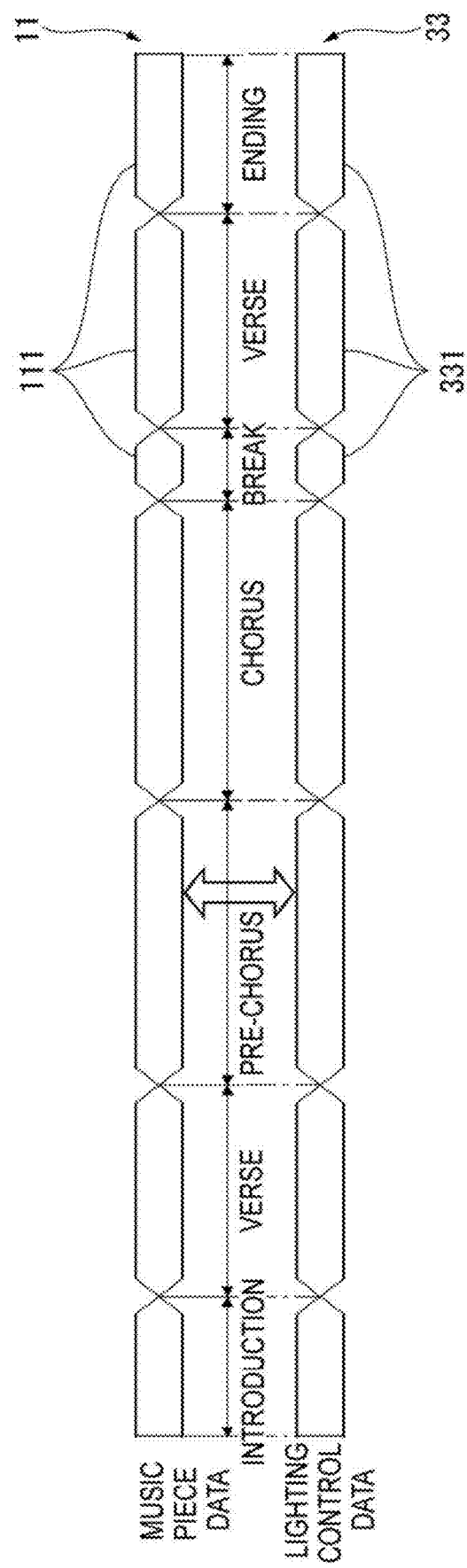

FIG. 2 schematically illustrates lighting control data corresponding to music piece data.

Figure 3:
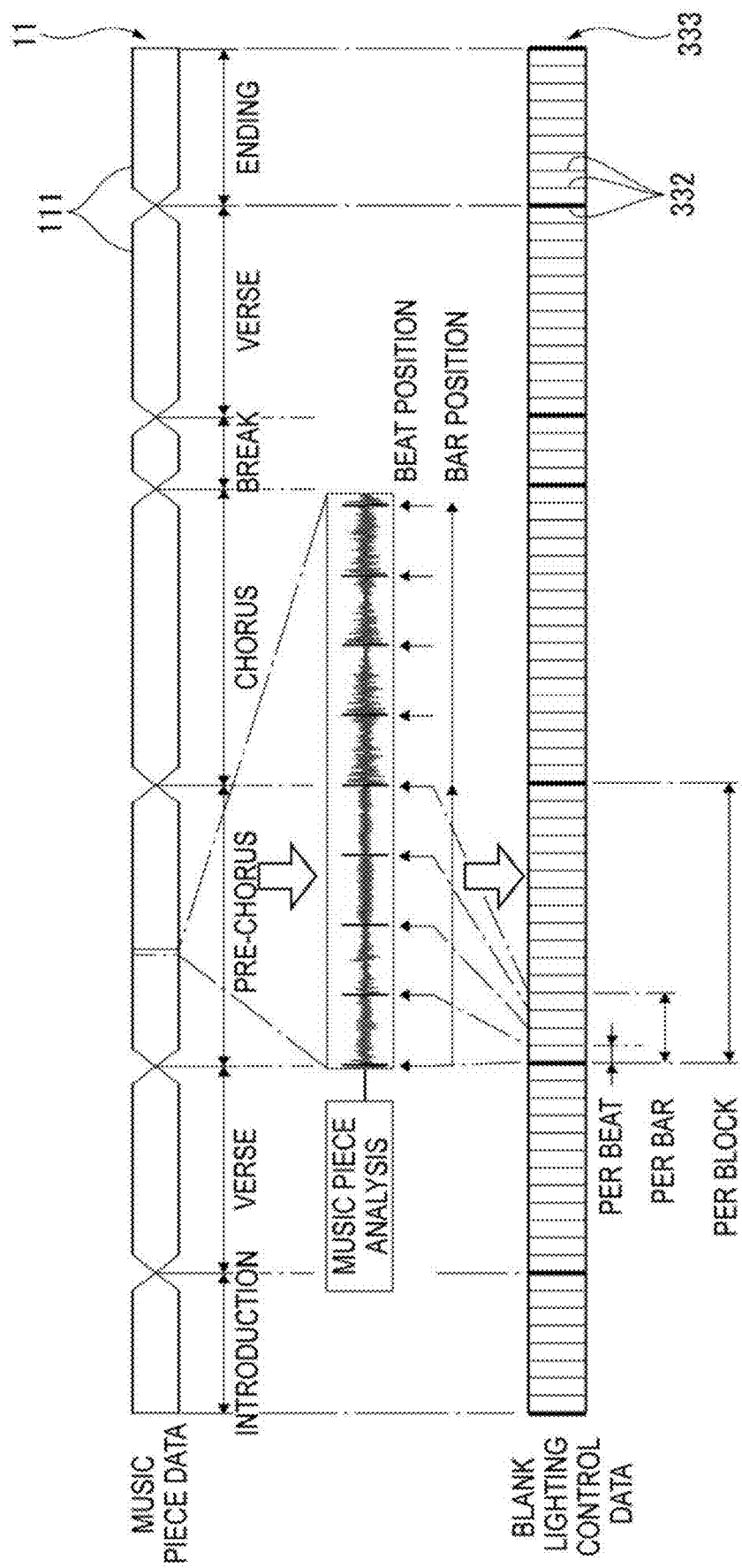

FIG. 3 schematically illustrates analysis of beat positions in a music piece and blank lighting control data of the music piece.

FIG. 4 schematically illustrates a process of setting lighting control information in each part of the music piece.

FIG. 5 schematically illustrates a relationship among an operational terminal, a process and lighting effect setting information.

FIG. 6 schematically illustrates a lighting control in response to a jump operation.

FIG. 7 schematically illustrates a lighting control in response to a roll effect operation.

FIG. 8 schematically illustrates a lighting control in response to a volume operation using a slider.

FIG. 9 schematically illustrates a sound volume ratio of a cross fader.

FIG. 10 schematically illustrates a lighting control in response to an operation using the cross fader.

DESCRIPTION OF EMBODIMENT(S)

Exemplary embodiment(s) of the invention will be described below with reference to the attached drawings.

FIG. 1 illustrates a sound responsive lighting system 1 used at a live-performance space in a night club and the like.

The sound responsive lighting system 1 includes: a music piece reproduction apparatus 10 configured to reproduce a music piece; a lighting fixture 20 configured to provide lighting in the live-performance space; and a lighting controller 30 configured to control the lighting fixture 20.

The music piece reproduction apparatus 10 includes: a general-purpose personal computer (PC) installed with a music piece reproduction software; and a sound system 13 connected to the PC. In the PC, the music piece reproduction software serves as a reproduction controller 12. Music piece data 11 stored in the PC is transmitted as a sound signal to the sound system, so that a music piece based on the music piece data 11 can be reproduced in a live-performance space.

The music piece data 11 is supplied to the music piece reproduction apparatus 10 via a network communication as well as in a form of a disc.

The music piece reproduction apparatus 10 is not limited to a PC audio system using the above general-purpose PC and may be a dedicated disc reproduction apparatus or music piece data reproduction apparatus.

The music piece reproduction apparatus 10 is connected to a DJ controller 19 (i.e., a music piece reproduction controller) used by a user (i.e., DJ) in order to conduct a special reproduction (e.g., scratching) or a sound effect operation.

The DJ controller 19 has operational terminals (i.e., a jog dial, pad, rotary volume knob, volume slider, switch and selector) required for reproduction control of a music piece to be reproduced by the music piece reproduction apparatus 10.

The rotary volume knob and the volume slider among the operational terminals are used for a continuously changing operation of parameters regarding the music piece reproduction (e.g., an entire sound volume, a low-pitched sound volume, and channel assignment).

The switch and the selector are used for an intermittently changing operation such as turn-on or turn-off and selection regarding the music piece reproduction.

A pad is used for a pad operation such as addition of optional sound effect(s) assigned in advance.

The jog dial is used for a jog operation (e.g., scratching) for the special reproduction of changing a temporal position of the music piece data that is being reproduced.

It should be noted that the DJ controller 19 is not limited to the music piece reproduction controller externally connected to the music piece reproduction apparatus 10, but may be incorporated in the music piece reproduction apparatus 10.

The lighting fixture 20, which provides lighting in a live-performance space and an event space, includes various lighting devices 21 mainly used as live-performance equipment.

Examples of the lighting devices 21 mainly used for stage lighting include a bar light, an electronic flash, and a moving head. In each of the lighting devices 21, parameters such as on and off of the lighting, brightness thereof, and, depending on the lighting device, an irradiation direction and a moving speed of the lighting device can be specified.

In order to control the above parameters, the lighting devices 21 of the lighting fixture 20 complying with DMX512 regulations are connected to each other in accordance with the DMX512 regulations and lighting control signals 22 in accordance with the DMX512 regulations are transmitted to the corresponding lighting devices 21 to allow the lighting devices 21 to provide a desired lighting.

It should be noted that, although the DMX512 regulations are common regulations in a field of the stage lighting, the lighting fixture 20 and a later-described lighting controller 30 may comply with other regulations.

The lighting controller 30 is a general-purpose PC, a built-in device and the like installed with a lighting control software for controlling according to the exemplary embodiment of the invention. It should be noted that the lighting controller 30 in a form of a PC may share the above-described PC used for the music piece reproduction apparatus 10.

The lighting controller 30 includes an information acquiring unit 31, a lighting control information editing unit 32, a lighting controller 34, and an operation interlock control unit 39 (including a lighting effect setting unit 38), which are configured to function when the lighting control software runs.

Among the above units, the information acquiring unit 31 and the lighting control information editing unit 32 are configured to generate lighting control data 33 corresponding to the music piece data 11.

On the other hand, the lighting control unit 34 is configured to control the lighting fixture 20 based on the generated lighting control data 33. In the exemplary embodiment, the lighting control unit 34 is configured to function when a DMX control software runs on the PC of the lighting controller 30. The lighting control data 33 is the DMX control program to be processed in the lighting control unit 34.

The lighting control data 33 and the lighting control unit 34 comply with the DMX512 regulations of the lighting fixture 20. When lighting operations are recorded in the lighting control data 33 in accordance with the DMX512 regulations, the lighting control unit 34 can control the lighting fixture 20 to provide a desired lighting operation.

It should be noted that the lighting control unit 34 may be not the DMX control software but a hardware DMX controller connected to the PC used as the lighting controller 30. When the lighting fixture 20 complies with regulations other than the DMX regulations, the lighting control unit 34 also complies with the same regulations as those of the lighting fixture 20.

In the exemplary embodiment, pieces of lighting control information are allocated correspondingly one-to-one to parts of the music piece data 11 in the lighting control data 33.

As shown in FIG. 2, the music piece data 11 includes blocks 111 such as an introduction, verse, pre-chorus, chorus, break, verse repetition, and ending.

Lighting control information 331 corresponding to each of the blocks 111 is set in the lighting control data 33. Specifically, respective pieces of the lighting control information 331 are allocated to the introduction, the verse, the pre-chorus, the chorus, the break, the verse repetition, and the ending.

For allocating the lighting control information 331, the information acquiring unit 31 and the lighting control information editing unit 32 each perform a process with reference to beat position in the music piece.

The information acquiring unit 31 reads in the music piece data 11 from the music piece reproduction apparatus 10, conducts a music piece analysis of the recorded sound data to detect the beat positions and tempos of the music piece, and records the detected beat positions and tempos as music piece analysis information. In the music piece analysis information, the beat positions can be recorded as corresponding temporal positions on the music piece data 11.

Further, the information acquiring unit 31 may distinguish a drum sound and a snare sound and, for instance, detect $1^{st}$ and $3^{rd}$ beat positions for the drum sound and $2^{nd}$ and $4^{th}$ beat positions for the snare sound, thereby detecting bar positions. Moreover, the information acquiring unit 31 may analyze keys and chords of the music piece and, for instance, detect a distribution of phrases, thereby detecting a block (e.g., a verse, pre-chorus and chorus) consisting of a plurality of bars.

A technology of conducting such a music piece analysis is exemplified by the technology disclosed in the patent publication JP 2010-97084 A.

The lighting control information editing unit 32 is configured to generate the lighting control data 33 to be transmitted to the lighting control unit 34. For data generation, a plurality of reference positions for allocating the lighting control information are plotted on a basis of the beat positions of the music piece analysis information obtained by the information acquiring unit 31. As shown in FIG. 3, for instance, blank lighting control data 333 having a length corresponding to the length of the music piece data 11 is generated in advance and reference positions 332 are recorded at respective temporal positions, which correspond one-to-one to the beat positions, in the blank lighting control data 333. As a result, the blank lighting control data 333 having the length corresponding to the length of the music piece data 11 and being divided into small units defined by many reference positions 332 can be obtained.

The lighting control information editing unit 32 edits the blank lighting control data 333 sectioned by the reference positions 332 to allocate the lighting control information 331 (see FIG. 2) to each of the target parts of the blank lighting control data.

As shown in FIG. 4, for instance, the DJ (user) determines a lighting image 334 based on an image of each of the blocks 111 of the music piece data 11. The lighting control information 331, which specifically represents the lighting image 334, is allocated to the blank lighting control data 333.

The lighting control information 331 includes information specifying the above lighting devices 21 in the lighting fixture 20 and specifying the parameters for each of the lighting devices 21, such as On/Off of the lighting, brightness thereof, and, depending on the lighting device, an irradiation direction and a moving speed of the lighting device.

The user may define the lighting control information 331 each time when specifying the above factors. Alternatively, at least one lighting control information set with high versatility may be preset in the lighting control information editing unit 32 in advance so that the user can select the information set as the lighting control information 331.

Still alternatively, sets of lighting control information may be combined in advance to generate a lighting pattern that evokes a predetermined image, which includes a simple image (e.g., "dark", "bright", "red" and "blue") and an emotional image (e.g., "lively", "cheerful", "lonely", "sad", and "frightening").

In allocating the lighting control information 331, for instance, the blank lighting control data 333 is displayed on the screen of the PC in the form of a bar graph with grid(s) representing the reference positions 332. The user can thus roughly allocate the lighting control information 331 to a position of each of target sections defined by the grid(s) on the screen using, for instance, a keyboard and/or a pointing device (e.g., touchpad) connected to the PC.

Although the lighting control information 331 would be roughly allocated, the lighting control information editing unit 32 repositions the lighting control information 331 to be fitted to the closest one of the reference positions 332.

Specifically, as shown in FIG. 4, the lighting control information editing unit 32 records the lighting control information 331 on the blank lighting control data 333 with reference to the reference position 332. In other words, a starting position of the set lighting control information is forced to be positionally adjusted (so-called sucked) to the nearest one of the reference positions.

For instance, when a lighting control information set A is set at a verse part of a music piece, the lighting control information editing unit 32 embeds the lighting control information 331 corresponding to the lighting control information set A into a part of the lighting control data 33 corresponding to the verse part.

The lighting control information editing unit 32 thus generates the lighting control data 33 containing the pieces of lighting control information 331 allocated to be neatly fitted to the respective reference positions 332.

It should be noted that the starting position of the lighting control information 331 in the lighting control data 33 may be deliberately misaligned from the closest one of the reference positions 332. Specifically, the value representing the temporal position of the lighting control information 331 allocated in the lighting control data 33 may be changed to a value representing a position different from the corresponding one of the reference positions 332 by a user's operation. Alternatively, the user may perform an operation for changing the starting position of the lighting control information 331 shown on the screen to a desired position on the lighting control data 33, thereby changing the temporal position.

The lighting control data 33, in which the lighting control information 331 is allocated by the lighting control information editing unit 32, is referred to by the lighting control unit 34.

The lighting control unit 34 controls the lighting fixture 20 based on the generated lighting control data 33 as described above.

The lighting control unit 34 usually controls the lighting fixture 20 by processing the lighting control data 33 in synchronization with an operation of the reproduction control unit 12 of the music piece reproduction apparatus 10 for processing the music piece data 11 to reproduce it, thus achieving a desired lighting.

Here, when the DJ (user) uses the DJ controller 19 to perform the operation related to reproducing the music piece, the lighting control unit 34 changes the control of the lighting fixture 20 correspondingly to the operation.

Thus, the lighting control unit 34 is connected to the operation interlock control unit 39, which includes the lighting effect setting unit 38, and the operation interlock control unit 39 is configured to receive an operation signal from the DJ controller 19.

It should be noted that the operation interlock control unit 39 is not necessarily directly connected to the DJ controller 19 and may be configured such that an operation signal having been inputted to the music piece reproduction apparatus 10 from the DJ controller 19 is transferred to the operation interlock control unit 39.

The operation interlock control unit 39 may obtain, instead of an operation signal from the DJ controller 19, a displacement of the current reproduction position or a variation in reproduction speed provided to the reproduction control unit 12 as a result of operating the DJ controller 19.

The operation interlock control unit 39 monitors the operation signal from the DJ controller 19 and detects, in response to an operation on any one of the operational terminals (e.g., the pad) specified in advance by the lighting effect setting information 18, an operation content (e.g., roll effect execution) related thereto. The lighting effect setting unit 38 then obtains lighting effect information corresponding to the detected operation content with reference to the preset lighting effect setting information 18 and transmits the lighting effect information to the lighting control unit 34.

As shown in FIG. 5, the lighting effect setting information 18 specifies the operational terminals (e.g., the rotary volume knob, volume slider, pad, jog dial, switch, and selector) of the DJ controller 19 and also specifies "lighting effect information" defining a lighting effect corresponding to a "process" to be executed by the operation on the "operational terminals."

For instance, when the operational terminal "rotary volume knob" is operated for a process of "low-pitched sound volume increase or decrease," "shifting the lighting toward a blue lighting at the increase while shifting the lighting toward a red lighting at the decrease" is selected as the corresponding lighting effect information.

As shown in FIG. 5, when the operational terminal "cue button" is operated for a process of "jump to a cue point," in other words, when the reproduction position of the music piece is changed, "the maximum light intensity at the time of the jump" is selected as the corresponding lighting effect information.

As shown in FIG. 6, lighting L61 set for the pre-chorus of the lighting control data 33 is provided in the pre-chorus of the music piece data 11. Here, when the cue button is pressed at a position P61 in the information music piece data 11, the lighting is provided at the maximum light intensity from the position P61 to a next beat position P62 on a basis of the lighting effect information corresponding to the process of "jump to a cue point." Subsequently, when the reproduction of the music piece data 11 reaches the next beat position P62, the reproduction jumps to a jump destination P63 (e.g., a starting beat position of a break), at and after which lighting L63 set for the break in the lighting control data 33 is provided.

As shown in FIG. 5, when the operational terminal "A pad" is operated for a process of "roll effect addition," in other words, when the operation is to repeatedly reproduce a specified section of the music piece and change a cycle of the repetitive reproduction, "flash lighting at a roll interval" is selected as the corresponding lighting effect information.

As shown in FIG. 7, lighting L71 set for the pre-chorus of the lighting control data 33 is provided in the pre-chorus of the music piece data 11. Here, when the cue button is pressed at a position P71 in the information music piece data 11, the lighting is provided in a form of "flash lighting at a roll interval" from the position P71 to a beat position P72 determined after a predetermined number of beats from the position P71, on a basis of the lighting effect information corresponding to the process of "roll effect addition." Subsequently, when the reproduction of the music piece data 11 reaches the next beat position P72, the lighting is returned to the lighting L71 set for the pre-chorus in the lighting control data 33.

As shown in FIG. 5, when the operational terminal "volume slider" is operated for a process of "sound volume increase or decrease," "brightening at the increase while darkening at the decrease" is selected as the corresponding lighting effect information.

As shown in FIG. 8, lighting L81 set for the pre-chorus of the lighting control data 33 is provided in the pre-chorus of the music piece data 11. Here, when a sound volume from the position P81 to the position P82 in the music piece data 11 is decreased from a sound volume V81 to a sound volume V82 using the volume slider for adjusting the sound volume, lighting L82 of "darkening at the decrease" is provided from the position P81 to the position P82 on a basis of the lighting effect information corresponding to the process of "sound volume increase or decrease." The lighting is returned to the original bright lighting L81 after the position P82 where the volume operation ends.

As shown in FIG. 5, the operational terminal "cross fader" is operated for a process of "changing a sound volume ratio between a plurality of music pieces," in other words, when changing a ratio of a reproduction sound volume between the plurality of music pieces (i.e., cross-fading), "transition of the lighting effect set for each of the music pieces" is selected as the corresponding lighting effect information.

As shown in FIG. 9, a cross fader (a horizontal volume slider) of a typical DJ controller is configured such that, when a knob is positioned at a left end of the cross fader, a sound volume of a music piece reproduced on a left channel A is outputted at 100% with a 0% sound volume of a music piece reproduced on a right channel B. On the other hand, when the knob is positioned at a right end of the cross fader, the sound volume of the music piece reproduced on the left channel A is at 0% with the 100% sound volume of the music piece on the right channel B. Rightward and leftward movement of the cross fader increases and decreases the sound volume on the left channel A as shown in a line A and the sound volume on the right channel B as shown in a line B.

For instance, the knob of the cross fader is moved to the left end thereof to reproduce a preceding music piece on the left channel A (i.e., to output the preceding music piece at a 100% sound volume). In this state, a subsequent music piece is reproduced on the right channel B (i.e., to output the subsequent music piece at a 0% sound volume, in other words, not to output the subsequent music piece).

As the knob of the cross fader is moved rightward from the left end, a sound volume ratio of the channel A is decreased while a sound volume ratio of the channel B is increased. In other words, in conjunction with the movement of the knob in the cross fader, the sound volume of the preceding music piece (on the left channel A) is gradually decreased while the sound volume of the subsequent music piece (on the right channel B) is gradually increased.

When the knob finally reaches the right end, the sound volume of the preceding music piece reproduced on the channel A becomes 0% with the 100% sound volume of the subsequent music piece on the channel B.

In short, the gradual movement of the knob in the cross fader enables a smooth transition from the preceding music piece to the subsequent music piece.

As shown in FIG. 10, music piece data A (the preceding music piece) is reproduced on the left channel A in a section positioned left from a position P101. At this time, the knob is positioned at the left end of the cross fader, where the sound volume on the channel A is at 100%, in other words, only the preceding music piece on the channel A is played or outputted as sounds, Here, the lighting is provided according to the lighting effect data A set in the music piece data A.

During the reproduction of the preceding music piece, music piece data B (the subsequent music piece) is reproduced on the right channel B. When the knob remains at the left end of the cross fader, in other words, when the sound volume on the right channel B is at 0%, the subsequent music piece on the channel B is not outputted (played) as sounds.

Here, in a section from the position P101 to a position P102, the knob of the cross fader is moved from the left end to the right end over a predetermined time.

This operation decreases the sound volume on the right channel A from 100% to 0% and increases the sound volume on the channel B from 0% to 100%, thereby cross-fading from the preceding music piece to the subsequent music piece.

When such a cross-fading is done, "transition of the lighting effect set for each of the music pieces" is selected as the lighting effect information.

As described above, lighting at the position P101 is provided on a basis of lighting effect information L101 set for the position P101 in the lighting effect data A set for the music piece data A (i.e., the preceding music piece).

When the knob is moved from the left end toward the right end in the cross fader, a ratio between the lighting effects is also changed in the same manner as the sound volume ratio between the channels A and B is changed. Specifically, a ratio of a set value for the lighting effect of the lighting effect data A corresponding to the preceding music piece is decreased from 100% to 0%, while a ratio of a set value for the lighting effect of the lighting effect data B corresponding to the subsequent music piece is increased from 0% to 100%.

As a result, lighting can be provided according to lighting effect information L102 for a continuous cross-fade from the lighting effect information L101 of the lighting effect data A at the position P101 to the lighting effect information L103 of the lighting effect data B at the position P102.

The "process" by the above operation can be exemplified by, in addition to the examples shown in FIG. 5, adjustment relating to the reproduction of the music piece (e.g., a level adjustment of other frequency zones (e.g., a high-pitched sound volume)), sound effects (e.g., pitch shift, key change, and reverberations addition), and increase or decrease in a reproduction speed and a tempo change of a music piece.

Accordingly, when the operation interlock control unit 39 detects an operation (e.g., a pad operation) given to the jog dial of the DJ controller 19, the lighting effect setting unit 38 selects the lighting effect information (e.g., the roll effect execution) and transmits the lighting effect information to the lighting controller 34, so that the lighting effect information can be applied to the lighting control of the lighting fixture 20.

Pieces of such lighting effect information may be set as the lighting effect setting information 18 in the lighting effect setting unit 38 in advance by a DJ or a manufacturer of the lighting controller 30.

Thus, the lighting controller 30 according to the exemplary embodiment can apply a suitable lighting effect corresponding to the operation given to the music piece that is being reproduced.

Since the process of "roll effect addition" using the operational terminal "A pad" or a process of "short reverb addition" using the operational terminal "B pad" is employed as the lighting effect corresponding to the operation, the lighting fixture 20 can change a lighting state corresponding to a change amount provided by the sound effect operation.

Particularly, since the process of "roll effect addition" by the operational terminal "A pad" is the sound effect operation of repeatedly reproducing specified parts of a music piece and changing a cycle of the repetitive reproduction, setting of "flash lighting at a roll interval" as the corresponding lighting effect information enables the lighting fixture 20 to change a lighting state corresponding to a change in the cycle of the repetitive reproduction.

Moreover, since the process "sound volume increase or decrease" using the operational terminal "volume slider" and the process "low-pitched sound volume increase or decrease" using the operational terminal "rotary volume knob" are employed, the lighting fixture 20 can change a lighting state corresponding to a change in each sound volume in response to the sound volume adjustment operation of changing a sound volume in a specified frequency zone or a sound volume in an entire zone of the music piece being reproduced.

It should be understood that the scope of the invention is not limited to the above-described exemplary embodiment but includes modifications and the like as long as the modifications and the like are compatible with the invention.

In the above exemplary embodiment, the music piece reproduction apparatus 10 is not limited to a PC audio system but may be a dedicated disc reproduction apparatus or music piece data reproduction apparatus. Moreover, the music piece reproduction apparatus 10 does not necessarily include the DJ controller 19 (a separate music piece reproduction controller) externally connected thereto, but includes therein a DJ controller to be operable by a DJ in some embodiments. In this arrangement, the lighting controller 30 detects the operations of the operational terminals provided in the music piece reproduction apparatus 10.

Further, the lighting controller 30 and the music piece reproduction apparatus 10 are integrated in some embodiments. For instance, software for operating the lighting controller 30 and the music piece reproduction apparatus 10 in the above exemplary embodiment is loaded in the same PC, whereby the lighting controller 30 and the music piece reproduction apparatus 10 work on the same PC in some embodiments.

The lighting fixture 20 and the lighting controller 30 are not limited to those complying with the DMX512 regulations, but may comply with other regulations.

Further, although the beat positions are used among the music piece analysis information and detected as the reference positions in the music piece to be defined as reference positions of the lighting control information in the above exemplary embodiment, a unit for specifying the lighting control information is not limited to the beat position having any length, but may be a bar unit obtained as the music piece analysis information or a block unit (e.g., verse, pre-chorus and chorus) consisting of a plurality of bars, in which the lighting control information may be set at each unit.

It should be noted that, even when the bar unit or the block unit is defined as the unit for specifying the lighting control information, the reference positions may be defined with reference to the beat positions.

In the above exemplary embodiment, the user's operations applied to the music piece reproduction controller (DJ controller) are detected and the lighting effect is changed corresponding to the kind of each of the detected operations, and the change amount, a change speed and the like of the music piece in response to each of the detected operations.

Here, with respect to the change in the lighting effects corresponding to the operations, a state of the lighting effect at the time of detection of the user's operation is determined as a reference state and the lighting effect can be changed corresponding to the operation from the reference state. Accordingly, with reference to the state of the lighting effect at the time of the user's operation, a lighting effect matching better with a current music piece can be provided.

However, at the time of detection of the user's operation, the lighting effect is reset to an initial value in the lighting controller in some embodiments. According to this process, with reference to the initial value in the lighting controller, the lighting effect is changeable corresponding to the operation. In other words, the same lighting effect is obtainable in response to the same operation (i.e., sound effect), so that a unity among the lighting effects and a strong impression of a lighting effect in response to a specific sound effect are obtainable.

In the above exemplary embodiment, the lighting control data 33 is generated in the lighting controller 30. However, the lighting control data 33 is edited in an external device to be read into the lighting controller 30 in some embodiments. When the external device thus generates the lighting control data 33, the information acquiring unit 31 and the lighting control information editing unit 32 of the lighting controller 30 is omitted in some embodiments.

The invention claimed is:

1. A lighting controller comprising:
an information acquiring unit configured to acquire music piece information comprising information on a beat position in music piece data;
a lighting control unit configured to control a lighting fixture with reference to a predetermined lighting-effect change point; and,
an operation interlock control unit configured to apply a lighting effect to the control of the light fixture, wherein
a minimum unit of the predetermined lighting-effect change point being defined by the beat position
the operation interlock control unit is configured to record in advance at least one of information:
indicating a relationship between an operation applied on a music piece reproduction apparatus, which is configured to reproduce the music piece data as a music piece, or a music piece reproduction controller, which is configured to control the music piece reproduction apparatus, and a predetermined lighting effect corresponding to the operation; or,
indicating a relationship between the operation and the predetermined lighting effect corresponding to the process executed by the operation,
wherein when a user performs the operation related to reproducing the music piece applied on the music piece reproduction apparatus or the music piece reproduction controller, the operation interlock control unit applies the predetermined lighting effect corresponding to the operation by the user or a process executed by the operation by the user to the control of the lighting fixture according to the at least one of information.

2. The lighting controller according to claim 1, wherein the operation by the user is a sound effect operation for the music piece being reproduced, and
the predetermined lighting effect corresponding to the operation by the user comprises a change in a lighting state in response to a change amount caused by the sound effect operation.

3. The lighting controller according to claim 1, wherein the operation by the user is a sound volume adjustment operation for changing a sound volume of a specified frequency zone or a sound volume of an entire zone of the music piece being reproduced, and
the predetermined lighting effect corresponding to the operation by the user comprises a change in a lighting state in response to a change in the sound volume.

4. The lighting controller according to claim 1, wherein the operation by the user is a sound volume adjustment operation for continuously changing a sound volume ratio between the music piece being reproduced and another music piece, and
the predetermined lighting effect corresponding to the operation by the user comprises a change in a lighting state in response to a change in the sound volume ratio.

5. The lighting controller according to claim 1, wherein the operation by the user is a special reproduction operation for changing a reproduction speed of the music piece, and
the predetermined lighting effect corresponding to the operation by the user comprises a change in a lighting state in response to a change in the reproduction speed.

6. The lighting controller according to claim 1, wherein the operation by the user is a special reproduction operation for changing a reproduction position of the music piece, and
the predetermined lighting effect corresponding to the operation by the user comprises a change in a lighting state in response to the reproduction position.

7. The lighting controller according to claim 1, wherein the operation by the user causes a repetitive reproduction of a specified section of the music piece and changes a cycle of the repetitive reproduction, and the predetermined lighting effect corresponding to the operation by the user comprises a change in a lighting state in response to a change in the cycle of the repetitive reproduction.

8. A non-transitory computer-readable medium configured to store a program code configured to instruct a computer system to function as the lighting controller according to claim 1.

9. A lighting control method using a computer system, comprising:
   acquiring music piece information comprising information on a beat position in music piece data;
   controlling a lighting fixture with reference to a predetermined lighting-effect change point; and,
   applying a lighting effect to the control of the lighting fixture, wherein
   a minimum unit of predetermined the lighting-effect change point being defined by the beat position, recording in advance at least one of information:
   indicating a relationship between an operation applied on a music piece reproduction apparatus, which is configured to reproduce the music piece data as a music piece, or a music piece reproduction controller, which is configured to control the music piece reproduction apparatus, and the predetermined lighting effect corresponding to the operation; or
   indicating a relationship between the operation and the predetermined lighting effect corresponding to the process executed by the operation,
   wherein when a user performs an operation related to reproducing the music piece applied on the music piece reproduction apparatus or the music piece reproduction controller, applying the predetermined lighting effect corresponding to the operation by the user or a process executed by the operation by the user to the control of the lighting fixture according to the at least one of information.

\* \* \* \* \*